(12) United States Patent
Wang

(10) Patent No.: US 7,688,474 B2
(45) Date of Patent: *Mar. 30, 2010

(54) MOIRÉ-BASED AUTO-STEREOSCOPIC IMAGES BY DUPLEX PRINTING ON TRANSPARENCIES

(75) Inventor: Shen-Ge Wang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 934 days.

This patent is subject to a terminal disclaimer.

(21) Appl. No.: 11/263,190

(22) Filed: Oct. 31, 2005

(65) Prior Publication Data

US 2007/0097111 A1    May 3, 2007

(51) Int. Cl.
*H04N 1/40* (2006.01)
(52) U.S. Cl. .................. 358/3.28; 358/3.06; 358/3.3
(58) Field of Classification Search ................ 359/376; 358/3.06; 428/156, 167, 187, 203, 212, 201, 428/329, 195.1, 318.4; 524/539; 156/85
See application file for complete search history.

(56) References Cited

U.S. PATENT DOCUMENTS

| | | | | |
|---|---|---|---|---|
| 3,811,213 | A * | 5/1974 | Eaves | 40/437 |
| 4,158,481 | A * | 6/1979 | Hoyer | 359/478 |
| 5,866,233 | A * | 2/1999 | Oshima et al. | 428/172 |
| 6,103,345 | A * | 8/2000 | Oshima et al. | 428/172 |
| 6,296,281 | B1 * | 10/2001 | Stone | 283/93 |
| 6,317,226 | B1 * | 11/2001 | Yeh et al. | 359/2 |
| 6,329,040 | B1 * | 12/2001 | Oshima et al. | 428/156 |
| 6,575,564 | B1 * | 6/2003 | Tsuchiya et al. | 347/70 |
| 6,768,558 | B1 * | 7/2004 | Yamashita et al. | 358/1.18 |
| 6,995,883 | B2 * | 2/2006 | Deinhammer et al. | 359/2 |
| 7,130,126 | B1 * | 10/2006 | Chung | 359/619 |

(Continued)

FOREIGN PATENT DOCUMENTS

WO    WO 9914725    *    3/1999

OTHER PUBLICATIONS

Filed Oct. 31, 2005, entitled "Moiré-Based Auto-Stereoscopic Enhancement of Images for Duplex Rendering on Transparencies".

(Continued)

*Primary Examiner*—Mark K Zimmerman
*Assistant Examiner*—Dung D Tran
(74) *Attorney, Agent, or Firm*—Philip E. Blair; Fleit Gibbons Gutman Bongini & Bianco P.L.

(57) ABSTRACT

Method for duplex printing on transparencies to create auto-stereoscopic images. By choosing different halftone structures, differing by having different spatial frequencies for each of the two sides of a transparency, a moiré pattern resulting due to halftone overlapping can be observed. On one side of the transparency is provided a uniform halftone with a selected median spatial frequency as printed. On the other side, the printing consists of two partitions: what is to be perceived as the background is printed using a halftone with spatial frequency equal to the median plus some delta x, while a desired image partition is printed using a halftone with a spatial frequency equal to the median minus the same delta x. The spatial frequency difference creates a corresponding shift-magnification factor M with an amplified total depth of the shift-magnification factor M times the thickness of the transparency.

27 Claims, 7 Drawing Sheets

U.S. PATENT DOCUMENTS

| | | | |
|---|---|---|---|
| 7,194,105 B2 * | 3/2007 | Hersch et al. | 382/100 |
| 7,286,682 B1 * | 10/2007 | Sharma et al. | 382/100 |
| 7,394,596 B1 * | 7/2008 | Chung | 359/619 |
| 2003/0030271 A1 * | 2/2003 | Wicker | 283/113 |
| 2004/0076310 A1 * | 4/2004 | Hersch et al. | 382/100 |
| 2004/0084893 A1 * | 5/2004 | Fan et al. | 283/72 |

OTHER PUBLICATIONS

U.S. Appl. No. 11/263,368, filed Oct. 31, 2005, entitled "Moiré-Based Auto-Stereoscopic Watermarks".

* cited by examiner

MOIRÉ-BASED AUTO-STEREOSCOPIC IMAGES BY DUPLEX PRINTING ON TRANSPARENCIES

CROSS-REFERENCE TO RELATED APPLICATIONS

Attention is directed to copending applications: U.S. application Ser. No. 11/263,142, entitled "MOIRÉ-BASED AUTO-STEREOSCOPIC ENHANCEMENT OF IMAGES FOR DUPLEX RENDERING ON TRANSPARENCIES"; and U.S. application Ser. No. 11/263,368, entitled "MOIRÉ-BASED AUTO-STEREOSCOPIC WATERMARKS". The disclosure found in each of these copending applications is hereby incorporated by reference in its entirety.

BACKGROUND AND SUMMARY

The teachings presented herein relate generally to stereoscopic images. More specifically, the teachings presented herein relate to the creation of stereoscopic images by printing on transparencies.

The principle of stereoscopic vision is well understood. At the most basic level, each of the viewer's two eyes must perceive the subject matter to be viewed from a slightly different perspective. That is to say that, although the differences are generally quite subtle, each eye receives a different image.

Several methods are commonly used to produce stereoscopic images. On the one hand, these include the use of direction selective screens onto which two or more images may be projected simultaneously. Depending on the viewer's position, a different image may be observed by each eye. Where only two images are required, it is common practice to use polarizing techniques. Each image is projected with a characteristic polarization and when viewing through complementary polarizing viewing spectacles, each eye only sees the picture intended for its reception.

Most existing methods to view printed stereoscopic images require either special glasses (colored or polarized) or lenticular lenses. The stereogram may be the one exception which does not need any special viewing aid; however, many people find that it is very difficult and uncomfortable to see the hidden stereo image. Lenticular lenses are common but incur some additional expense and complexity as they require an embossed transparent material for operation.

What is needed is a method and apparatus for providing stereoscopic images that are viewable without the need for lenticular or other special lenses which may be readily and inexpensively provided with common materials using conventional printing apparatus.

Disclosed in embodiments herein is a moiré-based auto-stereoscopic rendered image. The rendered image comprises a transparent substrate having a front side and a back side. As applied to and placed on the front side of the transparent substrate is a front-side applied marking material of periodic structure having a first frequency. As applied to back side of the transparent substrate is a back-side applied marking material of periodic structure having a second frequency, that second frequency being some delta away from the first frequency such that when the transparent substrate is viewed from either side a moiré-based auto-stereoscopic rendered image is evident.

Further disclosed in embodiments herein is an alternate moiré-based auto-stereoscopic rendered image. The rendered image includes a transparent substrate having a first side and a second side, with a first side applied marking material having a periodic structure at a first frequency, as applied to and placed on the first side of the transparent substrate. The rendered image also includes a second side applied marking material as applied to the second side of the transparent substrate, that second side applied marking material further comprising a first partition and a second partition, the first partition having a periodic structure at a second frequency, that second frequency being related to but some delta away from the first frequency, and the second partition having a periodic structure at a third frequency, that third frequency being related to but some delta away from the first frequency, such that when the transparent substrate is viewed from either side a moiré-based auto-stereoscopic rendered image is evident.

Further disclosed in embodiments herein is an alternate moiré-based auto-stereoscopic rendered image, comprising: a transparent substrate; a first side applied marking material having a periodic structure at a first frequency, as applied to and placed on at least one side of the transparent substrate; an additional substrate having a selected side and, a second side applied marking material as applied to the selected side of the additional substrate which further comprises a first partition and a second partition, the first partition having a periodic structure at a second frequency, that second frequency being related to but some delta away from the first frequency, and the second partition having a periodic structure at a third frequency, that third frequency being related to but some delta away from the first frequency such that a moiré image is rendered.

Further disclosed in embodiments herein is a method for providing a moiré-based auto-stereoscopic rendered image, by applying marking material with a halftone periodic structure at a first frequency to the first side of a transparent substrate. The method further comprises applying marking material within a first partition on the second side of the transparent substrate with a halftone periodic structure at a second frequency, that second frequency being related to but some delta away from the first frequency. The method also comprises applying marking material within a second partition on the second side of the transparent substrate with a halftone periodic structure at a third frequency, that third frequency being related to but some delta away from the first frequency such that a auto-stereoscopic moiré image is rendered.

DETAILED DESCRIPTION

A methodology is herein taught using duplex printing on transparencies to create auto-stereoscopic images viewed in a "see-through" manner. By choosing different halftone structures for each of the two sides of a transparency, a moiré pattern resulting due to halftone overlapping can be observed. When the transparency is viewed at different angles (as is inherent with the distance from the left eye to the right eye of an individual observer), a very small lateral shift occurs between the front-side and the back-side prints due to the thickness of the transparency and would not be otherwise normally noticeable. However, the corresponding resulting moiré shift can be much greater than the above-mentioned lateral shift and can also be in a different direction. As a result, the moiré result is apparently visually perceived as located in the space in front of or behind the transparency. For example, using an ordinary transparency with an approximately 100 micron thickness as is typical for laser printers, the appearance of perceived depth from the resulting moiré can be as large as hundred times the thickness of the transparency, or about 10 mm deep. The method provided herein teaches how to select halftone frequencies and estimate the resulting appearance of depth for the corresponding resulting moirés. An example embodiment is taught below showing how moiré images with two different depths are created. There are many possible applications for this method, such as in security printing, for advertising novelties, or in the enhancement of graphics content.

Figure 1:
FIG. 1 shows a line halftone with spatial frequency f1=16 LPI.
Figure 2:
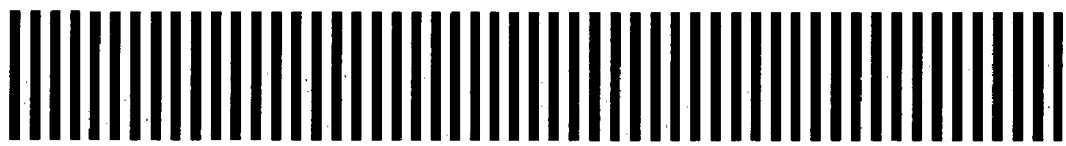
FIG. 2 shows line halftones with spatial frequencies f2=17 LPI.
Figure 3:
FIG. 3 shows an overlapping of the two line halftones f1 & f2 from FIGS. 1 & 2, one atop the other.

When two different halftones with similar spatial frequencies overlap each other, a moiré pattern may be observed. For example, FIGS. 1 and 2 are two line halftones with spatial frequencies f1=16 LPI (lines-per-inch) and f2=17 LPI, respectively. By overlapping the two halftones together, a moiré pattern, as shown in FIG. 3, can be observed. It is well known by those skilled in the art, that moiré frequency is equal to the difference or delta of the two line halftones, i.e., $\Delta f=f2-f1$. For the current example as provided in FIG. 3, $\Delta f=1$ LPI.

Figure 4:
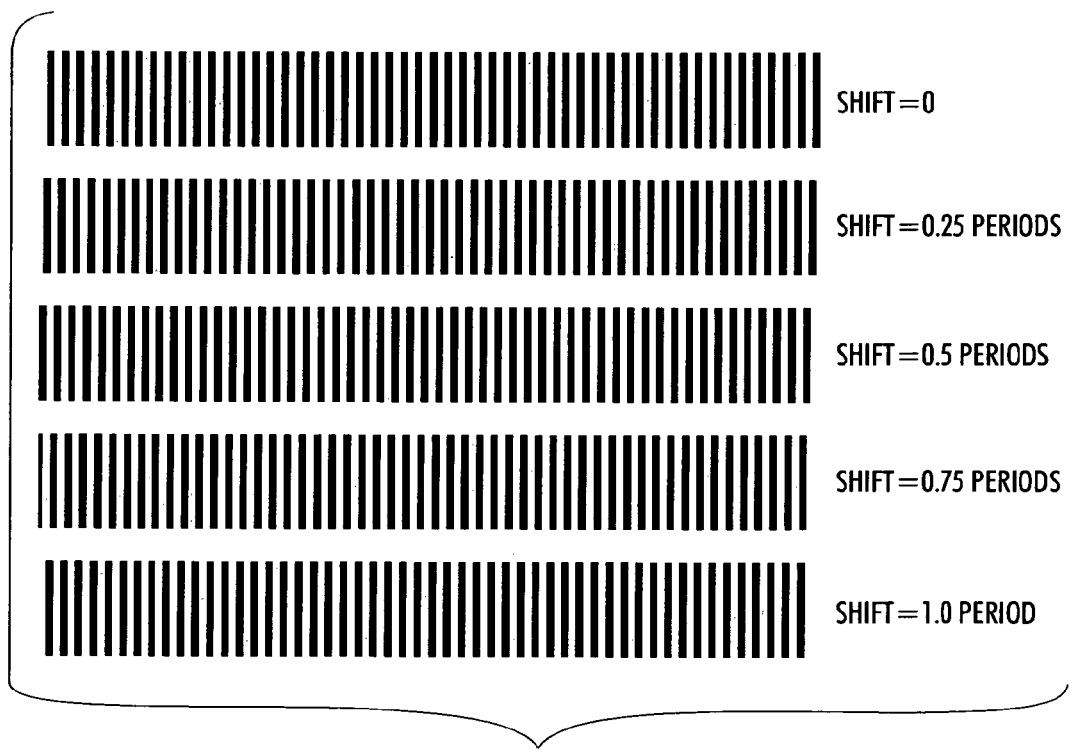
FIG. 4 shows the lateral shifting of the line halftone f2 from FIG. 2.

If one of the two line halftones is moved laterally with respect to another, the moiré also moves laterally but in different speed. To demonstrate the effect of a relative movement of two overlapped halftones, the line halftone f2 in FIG. 1 is shifted toward left in a step equal to a quarter of the period of the line halftone, or 0.25×1/17 inches. FIG. 4 shows the shift sequence of the line halftone f2 after four steps. The total lateral shift provided there is equal to 1/17 inches.

Figure 5:
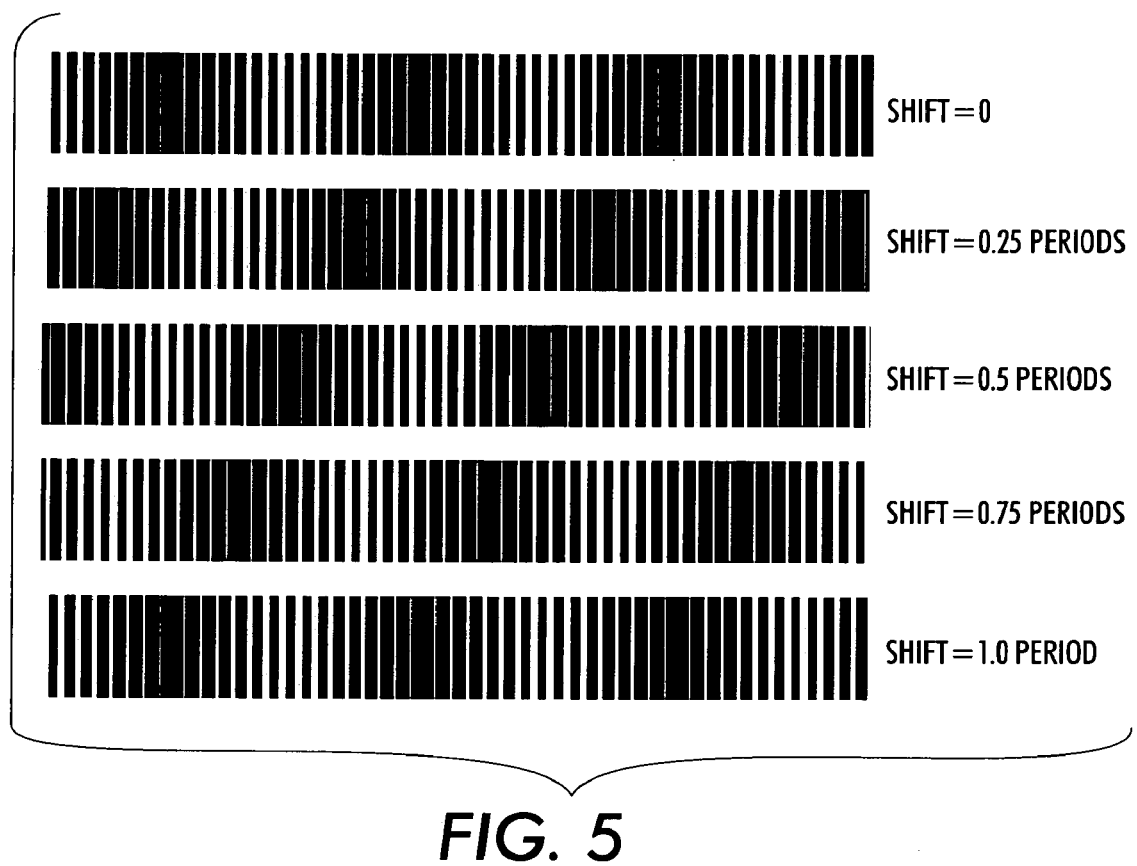
FIG. 5 shows the Moiré shift resultant from the overlap of f1 upon the lateral shift of f2 from FIG. 4.
Figure 6:
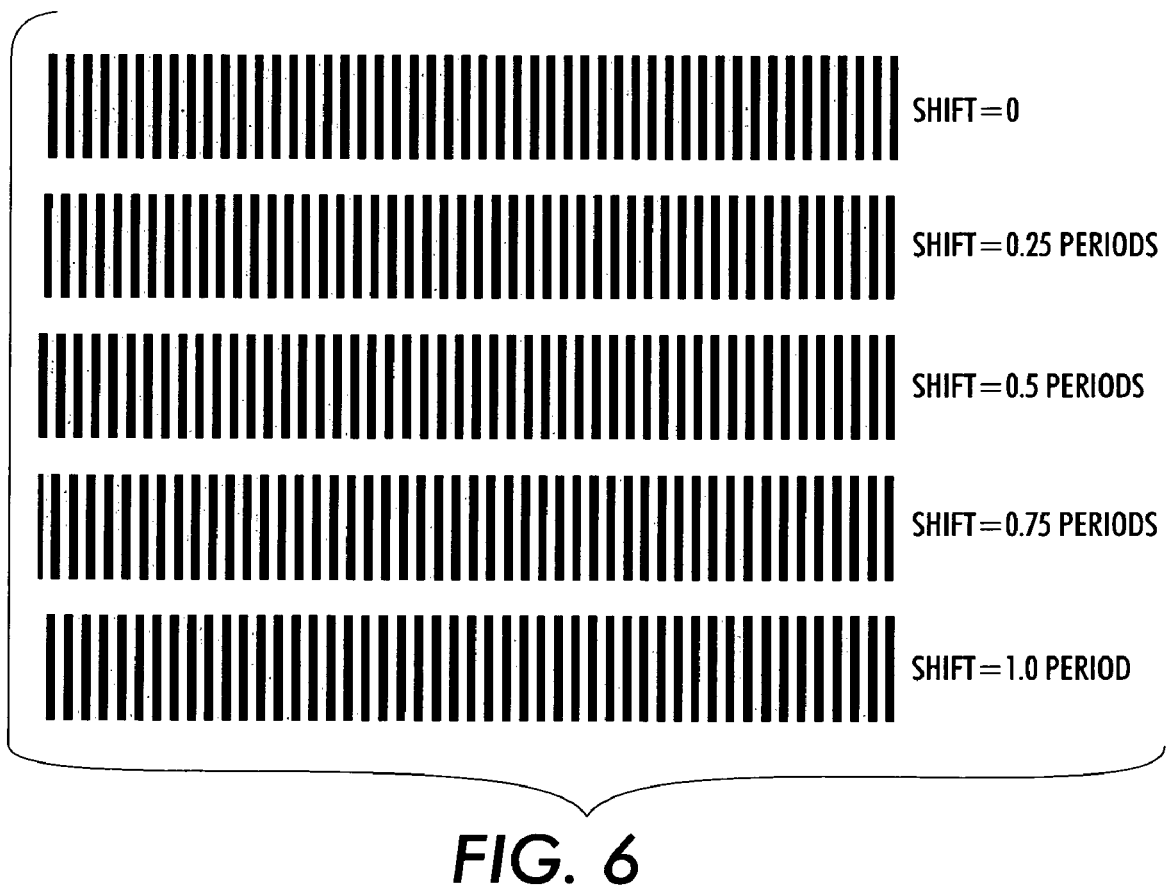
FIG. 6 shows the lateral shifting of the line halftone f1 from FIG. 1.
Figure 7:
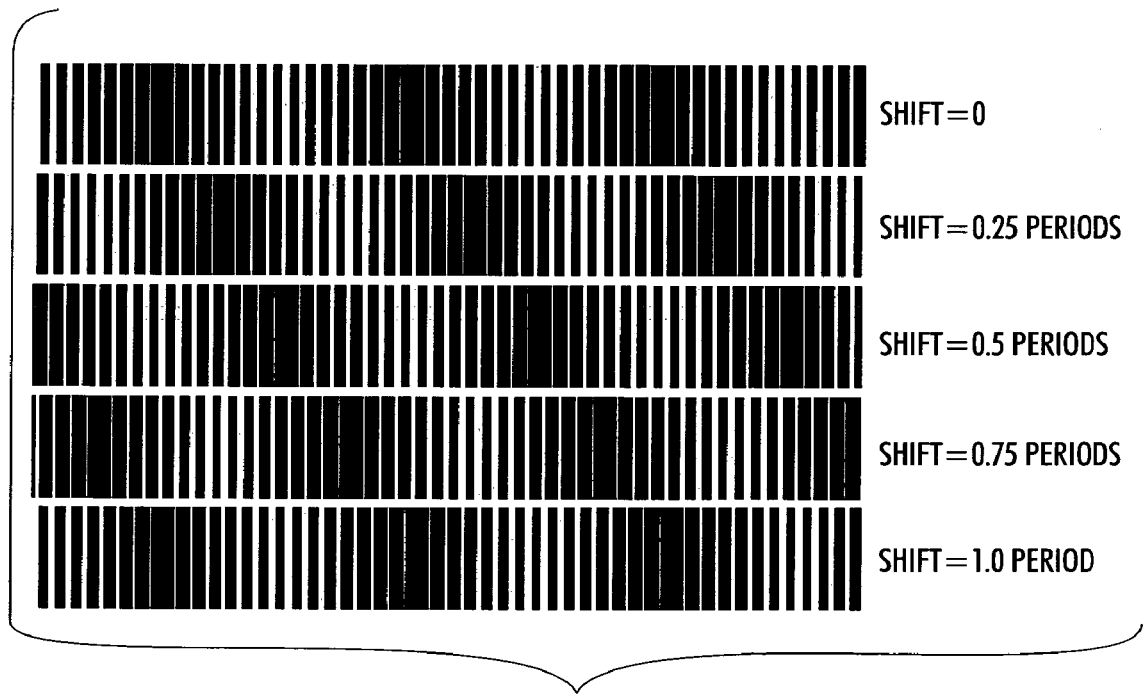
FIG. 7 shows the Moiré shift resultant from the overlap of f2 upon the lateral shift of f1 from FIG. 6.

By overlapping the shifted line halftone f2 to the halftone f1, one can see that the moiré is also shifted toward left in this case as depicted in FIG. 5 and the total lateral shift of the moiré after four steps is exactly equal to the period of the moiré, or one inch. It is also not difficult to see that the moiré moves in an opposite direction, if the lateral shift happens to the line halftone f1, when f2>f1. FIGS. 6 and 7 similarly demonstrate the result with a lateral shift of f1.

For the current analysis, we may assume that the moiré frequency is much, much less than the halftone special frequency or: $\Delta f \ll f$, where $f=(f1+f2)/2$ and $\Delta f=f2-f1$. Therefore, ignoring small differences in calculation, we may summarize the two cases of moiré shift in FIGS. 5 and 7 as follows: when the two overlapped halftone lines, f1 and f2, have a relative lateral shift, the moiré always moves in the direction defined by the movement of f2, the halftone with a higher spatial frequency. The moiré moves M times faster than the relative movement between f1 and f2, or M may be expressed as given by:

$$M=f/\Delta f, \text{ where } f=(f1+f2)/2 \text{ and } \Delta f=f2-f1. \quad (1)$$

Figure 8:
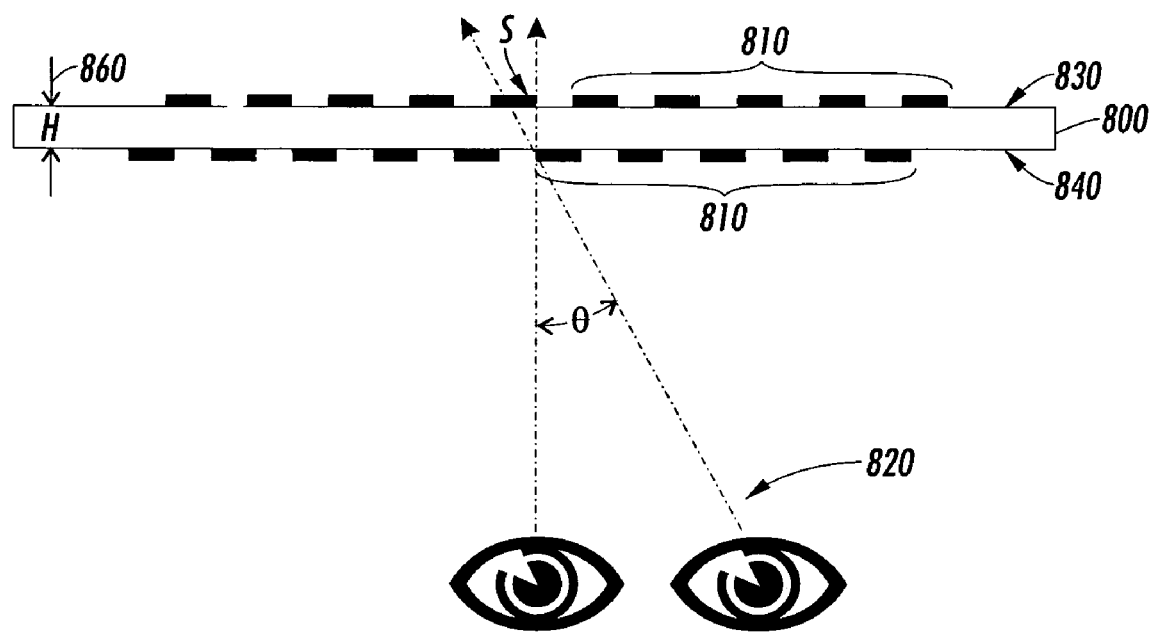
FIG. 8 shows as schematically depicted the eyes of an observer as viewing a transparency provided with duplex printing thereupon.

In FIG. 8 there is schematically depicted the eyes of an observer as viewing a transparency provided with duplex printing thereupon. When a transparent substrate 800 as provided with print 810 on both transparency sides 830 & 840 is viewed in a such "see-through" matter, each of the two individual eyes 820 of an observer are seeing slightly different overlapping images as provided by the two sides of the transparency 830 & 840. Due to the difference of viewing angles, θ, between each of the two eyes, and the finite thickness of the transparency 860, or "H", as compared to the image seen by the left eye, the right eye sees the print on the back side of the transparency with a small lateral shift, "S", with respect to the print on the front side. The shift "S" is approximately equal to: S=θH; and gives the appearance of shifting to the right in this example. Since a normal transparency 800 is only about 100-micron thick and θ, the difference of viewing angles by two eyes 820, is typically less than 0.5 degrees at a normal reading distance, the lateral shift "S" is too small to create any stereoscopic view for most such duplex prints.

However, if the two line halftones depicted in FIGS. 1 and 2 as provided with different spatial frequencies, f1 and f2, and are printed on two sides of a transparency respectively, a moiré will be observed clearly in a "see-through" viewing configuration. Because of the stereoscopic view of the two-sided print due to the thickness of the transparency, the resultant moiré seen by the two eyes 820 of the observer is different. If the line halftone with a higher spatial frequency f2 is printed on the back side 830 and the halftone with a lower frequency f1 is on the front side 840, the moiré is moving towards to the right when the viewing is changed from left to right. As described in above, the shift of the moiré is much greater than that due to "S" (lateral shift), the relative lateral shift of the two-side prints. Indeed, it is magnified by a factor M, as given by Equation 1 above: $M=f/\Delta f$, where $f=(f1+f2)/2$ and $\Delta f=f2-f1$. Therefore, the moiré appears as if it were printed on the back side of a much thicker transparency. In other words, the stereoscopic view of the overlapping of the two line halftones creates a stereo moiré image located in the space behind the transparency at a distance approximately M times the thickness of the transparency "H". If the same transparency is viewed with the line halftone f2 on the front side and f1 on the back side, the moiré will appears as located in the space in front of the transparency and also at a distance approximately equal to M×H. With current printing technologies it is not difficult to generate halftone line structures with a fairly large frequency range, so the magnification M can be easily varied between zero up to a hundred. Hence, by choosing right combinations of f1 and f2 for the duplex printing, it is possible to create moiré-based auto-stereoscopic images with a depth range in the order of a few millimeters.

In one example a transparency shows a stereoscopic moiré image having two depth levels provided by using the technique described above. On one side of the transparency is provided a uniform line halftone with a spatial frequency of 120 LPI as printed. On the other side, the printing consists of two partitions: what is to be perceived as the background is printed using a line halftone with a 123 LPI spatial frequency, while a logo image partition is printed using a line halftone with a 117 LPI frequency. The spatial frequency difference between the line halftones on two sides is approximately equal to 3 LPI, thus, the corresponding shift-magnification factor M, as given by Equation 1 above, is about 40. Since the moiré produced by the two partition print images as visually located appear in two spatial planes as separated by the transparency, the total depth of this moiré image is about 80H, where "H" is the thickness of the transparency, and so is about 100 microns. Thus is yielded a moiré stereoscopic pattern clearly discernable to the human eye with out aid of lenses or other means.

The effective limitation to this magnification factor M, as given by Equation 1 above is constrained by two things. First is a given selected printer provides technology constraints as to the maximum print system frequency resolution, which at present is typically 300 LPI. This limits the upper moiré frequency limit. The second constraint is the human visual response to low frequency moiré as where low frequency beats (i.e. large Δf), if too low, will simply be right off the page.

Figure 9:
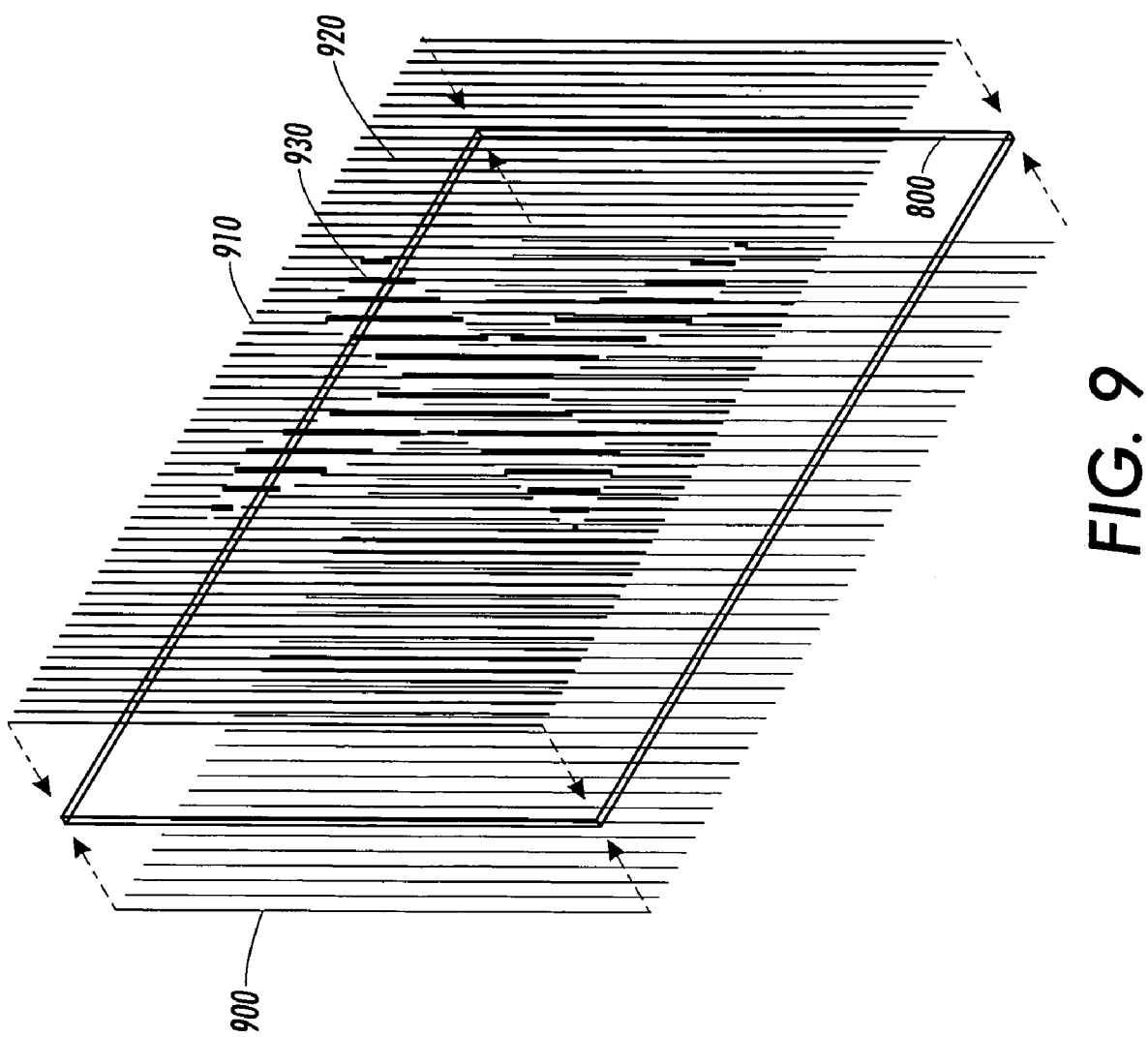
FIG. 9 shows an exploded-view schematical depiction of one possible exemplary embodiment.

FIG. 9 provides an exploded view, schematical depiction of one exemplary embodiment. Here transparent substrate 800 is provided with a front-side applied marking material of periodic structure 900, as well as, a back-side applied marking material of periodic structure 910. In this depiction, for the sake of explanation, the applied marking materials are shown as planes standing free of the substrate. However, in at least one embodiment, these applied marking materials of periodic structure are applied directly upon the transparent substrate's front and back sides, either by duplex printing or by way of conventional two pass printing. In another embodiment, one of the two applied planes of marking materials of periodic structure is alternatively applied to a second substrate instead of the transparent substrate 800 and that second substrate is then brought into close proximity and substantial alignment with the transparent substrate 800. Additional transparent substrates may also be placed between the transparent substrate 800 and the second substrate to effectuate a larger "H" and thus increase the perceived depth for an observer 820 as explained above.

On one side of the transparent substrate 800, the applied marking material of periodic structure 900 is provided by printing a uniform line halftone with a selected median spatial frequency. On the other side, for the applied marking material of periodic structure 910 there is provided by printing, two partitions: that which is to be perceived as the background partition 920 in this embodiment is printed using a line halftone with spatial frequency equal to the median plus some delta or difference in frequency amount (½Δf); while the desired image partition 930 is printed using a line halftone with a spatial frequency equal to the median minus the delta frequency amount. The spatial frequency difference between the line halftones on two sides creates a corresponding shift-magnification factor M. The moiré produced by the two print partitions 920 and 930 image as visually located in appearance in two separate spatial planes as separated by the transparency, with an effective amplified total depth as equal to the shift-magnification factor M times the thickness of the transparency. Thus is yielded a moiré stereoscopic pattern for the desired image partition 930 as clearly discernable to the human eye with out aid of lenses or other means.

As will be evident to those skilled in the art, transparent substrate 800 may be plastic, glass, Plexiglas, etc. as well as the typical presentation transparency slide intended for usage by print systems as employed in combination with overhead projectors. Indeed transparent substrate 800 may be only partially transparent or translucent, though the effect will be impeded. As should be clear from the above teachings thicker substrates such as glass will yield a more pronounced effect. As will also be obvious to those skilled in the art, the applied marking materials as discussed above may include liquid-based, toner-based, wax-based, inks or powders or solids, as well as paint or other pigment based materials.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A moiré-based auto-stereoscopic rendered image, comprising:
   a substantially transparent substrate having a first side and a second side;
   a first side applied marking material having a first periodic structure at a first frequency, as applied to and placed on the first side of the substantially transparent substrate; and,
   a second side applied marking material as applied to and placed on the second side of the substantially transparent substrate, the second side applied marking material further comprising a first contiguous partition and a second contiguous partition the second contiguous partition being distinct from the first contiguous partition,
      the first contiguous partition being filled with a second periodic structure at a second frequency, the second periodic structure being parallel to the first periodic structure and the second frequency being related to but some delta away from the first frequency, and
      the second contiguous partition being filled with a third periodic structure at a third frequency, the third periodic structure being parallel to the first periodic structure and the second periodic structure, and the third frequency being related to but some delta away from the first frequency and the second frequency, such that when the substantially transparent substrate is viewed from either side a moiré-based auto-stereoscopic rendered image is evident with the first partition and the second partition each appearing on different spatial planes.

2. The rendered image of claim 1 wherein the first periodic structure, second period structure, and the third periodic structure are respective line halftones.

3. The rendered image of claim 1 wherein the substantially transparent substrate is a typical presentation transparency slide as intended for usage by print systems and employed in combination with overhead projectors.

4. The rendered image of claim 1 wherein the substantially transparent substrate is glass.

5. The rendered image of claim 1 wherein the substantially transparent substrate is plastic.

6. The rendered image of claim 1 wherein the substantially transparent substrate is Plexiglas.

7. A moiré-based auto-stereoscopic rendered image, comprising:
   a substantially transparent substrate;
   a first side applied marking material having a first periodic structure at a first frequency, as applied to and placed on at least one side of the substantially transparent substrate;
   an additional substrate having a selected side and,
   a second side applied marking material as applied to and placed on the selected side of the additional substrate the second side applied marking material further comprising a first contiguous partition and a second contiguous partition the second contiguous partition being distinct from the first contiguous partition, the first contiguous partition being filled with a second periodic structure at a second frequency, the second periodic structure being parallel to the first periodic structure and the second frequency being related to but some delta away from the first frequency, and the second contiguous partition being filled with a third periodic structure at a third frequency, the third periodic structure being parallel to the first periodic structure and the second periodic structure, and the third frequency being related to but some delta away from the first frequency and the second frequency, such that when the substantially transparent substrate is viewed from either side a moiré-based auto-stereoscopic image is rendered with the first partition and the second partition each appearing on different spatial planes.

8. The rendered image of claim 7 wherein the additional substrate is opaque.

9. The rendered image of claim 7 wherein the additional substrate is transparent.

10. The rendered image of claim 7 wherein the additional substrate is translucent.

11. The rendered image of claim 7 wherein the substantially transparent substrate is translucent.

12. The rendered image of claim 7 wherein the additional substrate is brought into close proximity and substantial alignment with the substantially transparent substrate.

13. The rendered image of claim 12 further comprising a third substrate placed between the substantially transparent substrate and the additional substrate as brought into close proximity and substantial alignment with the substantially transparent substrate and additional substrate.

14. The rendered image of claim 7 wherein the applied marking material is toner-based.

15. The rendered image of claim 7 wherein the applied marking material is ink-based.

16. The rendered image of claim 7 wherein the applied marking material is wax-based.

17. The rendered image of claim 7 wherein the applied marking material is paint.

18. The rendered image of claim 7 wherein the applied marking material is liquid-based.

19. The rendered image of claim 18 wherein the applied marking material is shellac.

20. The rendered image of claim 7 wherein the first periodic structure, second period structure, and the third periodic structure are respective line screen halftones.

21. The rendered image of claim 20 wherein the first frequency is 120 LPI, the second frequency is 123 LPI and the third frequency is 117 LPI.

22. A method for providing a moiré-based auto-stereoscopic rendered image, comprising:
 applying marking material with a first halftone periodic structure at a first frequency to the first side of a substantially transparent substrate;
 placing marking material within a first contiguous partition on the second side of the substantially transparent substrate, the second contiguous partition being filled with a second halftone periodic structure at a second frequency, the second periodic structure being parallel to the first periodic structure and the second frequency being related to but some delta away from the first frequency; and,
 placing marking material within a second contiguous partition, that is distinct from the first contiguous partition, on the second side of the substantially transparent substrate, the second contiguous partition being filled with a third halftone periodic structure at a third frequency, the third periodic structure being parallel to the first periodic structure and the second periodic structure, and the third frequency being related to but some delta away from the first frequency and the second frequency such that a auto-stereoscopic moiré image is rendered with the first partition and the second partition each appearing on different spatial planes.

23. The rendered image of claim 22 wherein the first halftone periodic structure, the second halftone periodic structure, and the third halftone periodic structure are respective line halftones.

24. The rendered image of claim 22 wherein the substantially transparent substrate is a typical presentation transparency slide as intended for usage by print systems and employed in combination with overhead projectors.

25. The rendered image of claim 22 wherein the substantially transparent substrate is glass.

26. The rendered image of claim 22 wherein the substantially transparent substrate is plastic.

27. The rendered image of claim 22 wherein the substantially transparent substrate is Plexiglas.

* * * * *